E. DE LA CHAPELLE & J. PEARCE.

GLASS FURNACE.

No. 11,018. Reissued Aug. 6, 1889.

Witnesses:-
Louis M. T. Whitehead.
Wm. T. Fleming

Inventors:-
John Pearce - and -
Ernest de La Chapelle

By:- Dayton, Poole & Brown
Attorneys.-

N. PETERS, Photo-Lithographer, Washington, D. C.

UNITED STATES PATENT OFFICE.

ERNEST DE LA CHAPELLE AND JOHN PEARCE, OF OTTAWA, ILLINOIS.

GLASS-FURNACE.

SPECIFICATION forming part of Reissued Letters Patent No. 11,018, dated August 6, 1889.

Original No. 390,394, dated October 2, 1888. Application for reissue filed May 20, 1889. Serial No. 311,475.

*To all whom it may concern:*

Be it known that we, ERNEST DE LA CHAPELLE and JOHN PEARCE, both residents of Ottawa, in the county of La Salle and State of Illinois, have invented certain new and useful Improvements in Glass-Furnaces; and we do hereby declare that the following is a full, clear, and exact description thereof, reference being had to the accompanying drawings, and to the letters of reference marked thereon, which form a part of this specification.

This invention relates to improvements in glass and other furnaces, having reference more especially to devices for utilizing to aid combustion the heated air which is warmed by the heat given off from the exterior walls or which issues from the pot-holes, fire-doors, or other openings of such furnaces.

The invention consists in the matters hereinafter set forth, and pointed out in the appended claims.

Figure 1:
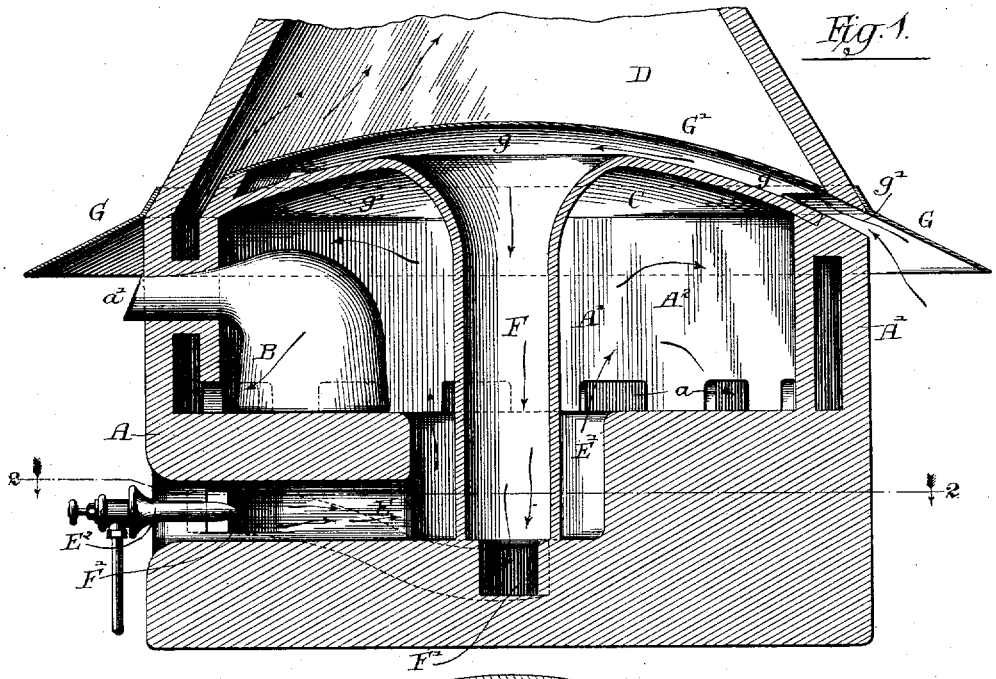
Figure 2:
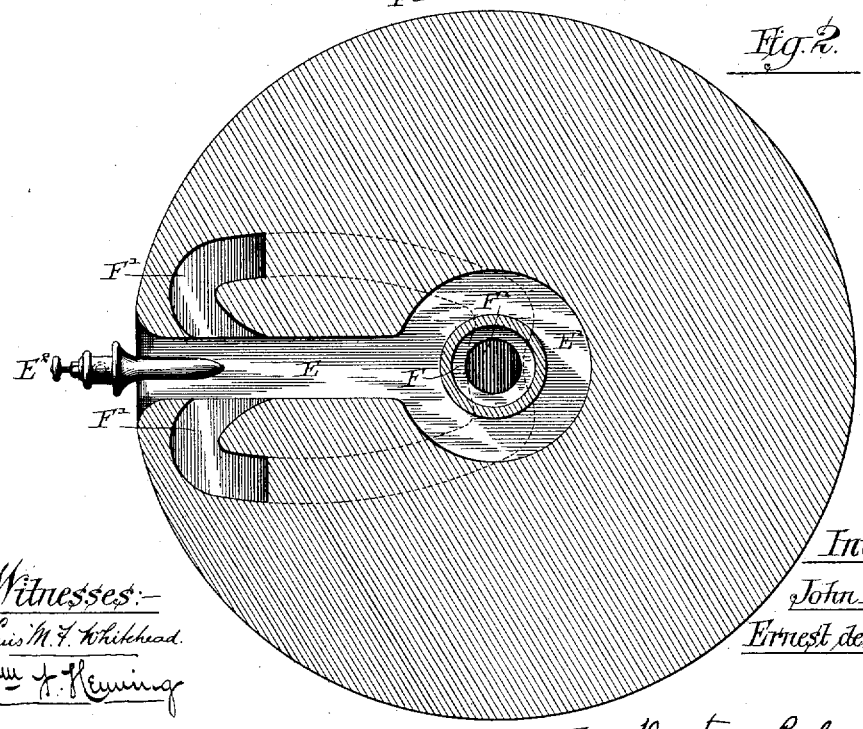

In the accompanying drawings, Figure 1 is a central vertical section of a glass-furnace containing our improvements, and Fig. 2 is a horizontal section through the line 2 2 of Fig. 1.

A represents the bed of the furnace, upon which rest the melting-pots B, and A′ is the circular wall surrounding the melting-chamber $A^2$.

C is the crown, and D is the conical chimney, of the furnace.

E is the fire-box, and E′ is the central space or upflue through which the flames rise from the fire-box E into the melting-chamber over the bed, whence the products of combustion pass outwardly through passages *a* in the circular wall A′ surrounding the bed A, and thence into the chimney D.

$E^2$ represents an oil-burner of any suitable construction, arranged in the fire-box, to send its flames forward into the upflue E′ and melting-chamber $A^2$, and G is an exterior canopy or hood projecting from the sides of the furnace over the pot-holes.

Ducts for air are provided having their inlets above the opening *a*′, through which the melting-pots are reached, and said ducts lead to the combustion-chamber E, so that they convey the hot air from outside the furnace to said combustion-chamber, where it may be mixed with the gases and vapor furnished by the burner and add its oxygen in a heated condition to the flames. In the best form of our invention of which we are now informed it is embodied in the devices shown in the drawings, which consist in a central flue F, leading from the space above the crown C downward through the melting-chamber and through the center of the upflue E′ to the bottom thereof, where it connects with branches F′, formed in any suitable manner in the masonry of the furnace, and leading from the lower end of the flue F to the opposite sides of the fire-box E, as indicated in the drawings. Desirably these flues F′ are curved so as to direct their contents forwardly into the furnace fire-box in the direction taken by the combustible materials furnished by the burner, and also, desirably, the outlets or mouths of said flues F′ are arranged about opposite or a little at the rear of opposite the delivery end of the burner, as also shown. To convey outer air to the central flue F and also to obtain the benefit of the heat imparted to the outer air from the furnace-wall and the mouths of the melting-pots, we provide the canopy G, located above the pot-holes *a*′, which canopy may be single and continuous, as shown, or, in other words, extending around the entire furnace. Also, over the crown of the furnace and at a little distance therefrom is located a sheet G′, giving a space *g* between the canopy and the sheet, and this space is connected with the space beneath the canopy G by any number of suitable passages *g*′ through the wall of the chimney-base. By the use of this canopy the air which is heated by contact with the wall A′ of the furnace, and particularly the air which is heated at the pot-holes *a*′, is conducted through the openings *g*′ into the space *g*, and thence passes downward through the central flue F and branch flues F′ into the fire-box E. By this construction the air as it is fed into the fire-box is intensely heated, having not only the benefit of the heat conveyed through the crown and wall of the flue F′, but also that which it derives from the exterior of the furnace and the heat escaping from the furnace at the pot-holes.

The same result secured by the construction above set forth will obviously be obtained in the application of the canopy and passages above described to furnaces other than glass-furnaces, the canopy and passages in such case serving to arrest the air arising from the heated walls of the furnace or from fire-doors or openings therein and conduct the same to the fire-box.

As far as some of the main features of our invention are concerned, a furnace embodying the same may be heated otherwise than by a liquid-fuel burner.

It is well known that heated air fed to a fire produces a better combustion than cold air, and we therefore make no broad claim for the use of hot air to supply oxygen to a fire.

We claim as our invention—

1. The combination, with a glass or other furnace, of a projecting canopy extending outwardly from the furnace-wall at or near the top of the latter, and an air passage or passages arranged to take heated air from the exterior of the furnace below the canopy and to conduct the same into the fire-box of the furnace.

2. The combination, with a glass or other furnace, of a central air-flue F, leading from above the crown of the furnace, a passage or passages leading from the exterior of the furnace to the top of said flue, and a passage or passages leading from the lower part of said flue to the fire-box of the furnace.

3. The combination, with a glass or other furnace provided with a fire-box and a heating-chamber, of a canopy extending outwardly from the furnace-wall at or near the top of the latter, and an air flue or flues leading from beneath the canopy through the heating-chamber into the fire-box.

4. The combination, with a glass or other furnace, of a central air-flue F, leading from above the furnace-crown, and provided with a branch or branches leading into the fire-box, a sheet G′, arranged over the crown and providing an air-space *g*, a canopy exterior to the furnace-wall at or near the top of the latter, and passages leading from beneath the canopy to the space *g*.

5. The combination, with a glass or other furnace provided with a fire-box and a fluid-burner within the fire-box, of a central flue F, communicating at its upper end with the exterior of the furnace, and provided with one or more branch flues leading from the lower end of said flue F to the fire-box and having their delivery ends directed toward the rear of the fire-box.

In testimony that we claim the foregoing as our invention we affix our signatures in presence of two witnesses.

ERNEST DE LA CHAPELLE.
JOHN PEARCE.

Witnesses:
GEO. M. TRIMBLE,
LORENZO LELAND.